Figure 1:
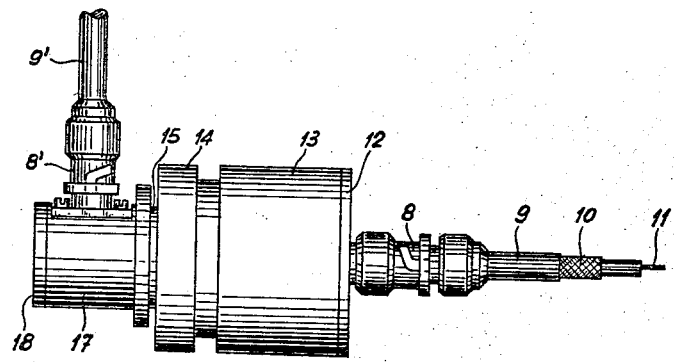

United States Patent Office 3,107,960
Patented Oct. 22, 1963

3,107,960
ROTATIONAL COUPLING FOR COAXIAL
HIGH-FREQUENCY LINES
Karl Neher, Louis Reinhard, and Walter Meyer, Zurich, Switzerland, assignors to Albiswerk Zurich A.G., Zurich, Switzerland, a corporation of Switzerland
Filed Mar. 9, 1961, Ser. No. 94,594
Claims priority, application Switzerland Mar. 14, 1960
5 Claims. (Cl. 339—8)

Our invention relates to a rotational coupling for transmitting high-frequency wave energy from a fixed coaxial line, having an inner and an outer conductor, to another coaxial line which is of the same design but is rotatable relative to the other.

Such couplings are required wherever high-frequency energy must be transmitted from a fixed structure to a rotating or rotatable structure as is often the case in radar equipment. In many cases, the amount of energy to be transmitted is extremely small. For that reason the coupling must not involve any changes in contact or transfer resistances or any changes in external electric fields as may affect the energy transmission. Such changes may become superimposed upon a high-frequency signal thus superimposing, after demodulation, an objectable noise upon the useful signal. The effect of external electric fields can be avoided by shielding the rotational coupling in the same manner as the high-frequency lines themselves, but the avoidance of changes in contact resistance is a more difficult matter.

It is known to provide rotational couplings without galvanic contact engagement by utilizing a capacitive or inductive coupling effect. An example of such a capacitive coupling is known from U.S. Patent 2,667,578. With such a design there occur reflections of all waves with the exception of the one to which the coupling is tuned. Hence such couplings assume an extremely narrow band characteristic. Corrective networks for increasing the limited band width cause considerable energy losses which must be compensated by additional amplification. Coaxial lines which, for increased transmission energy, are provided with liquid or gaseous dielectrics, require couplings that are gas-tightly sealed. Such couplings are described, for example, in U.S. Patents No. 2,428,546 and No. 2,449,138. The outer conductors of the two high-frequency lines to be coupled with each other are interconnected by contact brushes gliding on slip rings. The galvanic connection between the inner conductors is effected in one case through a spherical member and in the other case by means of a single contact brush. However, the high-frequency energy is conducted only through the inner conductor whereas the outer conductor of the coaxial line constitutes the shielding. The small amounts of signal energy being received are thus passed through variable contact resistances with the result that considerable noise is encountered. For that reason such couplings are employed exclusively for relatively high energies as occurring for example with transmitters.

The known disadvantage of gaseous or liquid dielectrics have resulted in an increased use of coaxial cables whose dielectrics predominantly consist of polyethylene. Such cables are interconnected by rotational couplings of the type known, for example, from U.S. Patents No. 2,422,961 and No. 2,452,168. Both devices provide spring contacts for the inner conductor as well as for the outer conductor of each coaxial line, these spring contacts being in gliding engagement with a slip ring. However, spring contacts cannot be so built, within the limits of reasonable expenditure, that all springs press against the slip ring with exactly the same force. In order to prevent these contacts from excessively wearing the slip rings, lubrication must be provided. Each of these disadvantages results in excessive noise, aside from the fact that the use of lubrication is unsuitable for devices called upon to operate at great temperature differences.

It is an object of our invention to avoid the above-mentioned shortcomings of the known rotational couplings for high-frequency coaxial lines and to provide a coupling device in which the signal to be transmitted passes through the coupling with any desired band width, without being subjected to appreciable superimposed noise and virtually without requiring attendance or maintenance work.

To this end, and in accordance with a feature of our invention, we provide the coupling with two coaxial slip rings of which the outer one is conductively connected with the outer conductors of the coaxial high-frequency lines to be joined with each other and is mechanically and electrically joined with the rotatable portion of the metallic housing of the coupling: We further provide a number of contact brushes which glidingly engage the slip rings but are somewhat inclined with respect to the slip-ring axis, one end of each brush being movably mounted in a brush holder. An elastic pressure means surrounds the brush ends located in the brush holders and presses the brushes simultaneously against the brush holder and also against the appertaining slip ring.

For providing approximately constant contact resistances, the surfaces of the contact brushes are preferably made of silver-graphite and the slip rings are made of hard silver, both materials being known as such for contact purposes.

Figure 2:
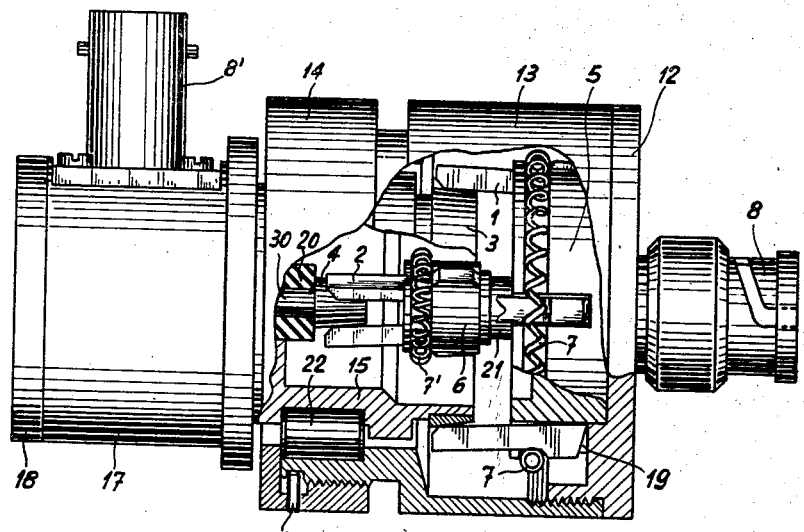
Figure 3:
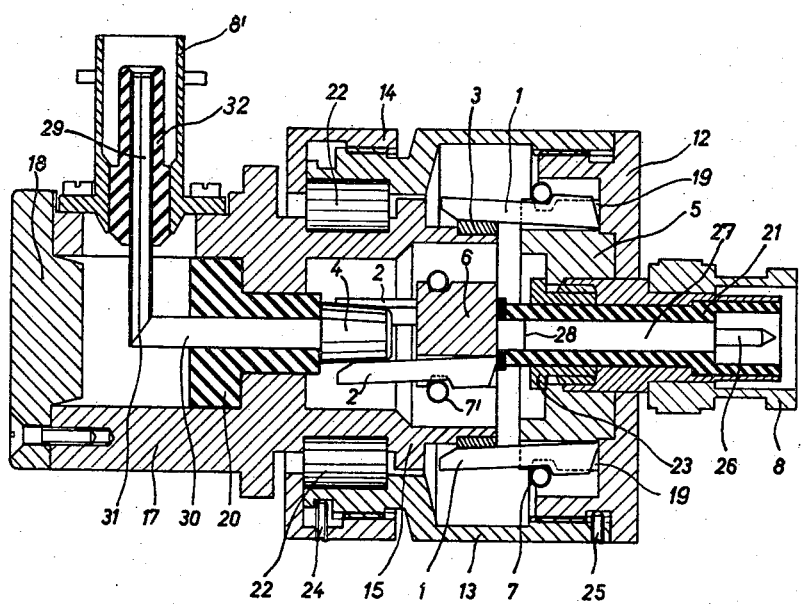

The objects, advantages and features of our invention, said features being set forth with particularity in the claims annexed hereto, will be apparent from the following description of the embodiment of a rotational coupling according to the invention illustrated by way of example on the accompanying drawing in which:

FIG. 1 is a lateral view of the coupling.
FIG. 2 shows the same coupling partly in section; and
FIG. 3 is an axial section through the same coupling.

The two coaxial lines 9 and 9' are each composed of an inner conductor 11 and an outer conductor or shield 10. The two lines are connected with the coupling by means of coaxial plug-in connectors whose respective socket portions are denoted by 8 and 8'. The shielding 10 of each high-frequency line is electrically connected with the socket 8 or 8', whereas the inner conductor 11, when the line is plugged-in, is connected with the inner contact, i.e. the male contact 26 or the female contact 29 of the connector. The connector socket 8 is mechanically and electrically connected with the metal cover 12 of the rotational portion of the housing, preferably by threaded engagement with a nipple of the cover 12. The rotational portion of the housing comprises, aside from the cover 12, a cylindrical intermediate portion 13 and a foot portion 14 which is in threaded engagement with a neck of the intermediate portion 13. The rotatable housing portion 12, 13, 14 is journaled relative to the fixed housing portion 17, 18 by means of rollers 22. The rollers are located between the intermediate housing portion 13 and a slip-ring holder 15 which forms part of the fixed housing portion 17 and carries a coaxial slip ring 3. The slip ring 3 is glidingly engaged by four peripherally distributed contact brushes 1. An annular brush holder 5 for the brushes 1 forms part of the rotatable housing portion and thus is electrically connected with the socket 8. Consequently, the socket 8 is conductively connected by the brushes 1 with the slip ring 3 of the fixed housing portion 15, 17 to which the second socket 8' is attached. The attachment of socket 8 to the rotatable housing portion is effected by a threaded ring 23 which is screwed into a nipple portion of cover 12 and has an annular flange resting against the brush holder 5.

The just-mentioned components, therefore, electrically connect the outer conductor or shield 10 of one coaxial line 9 with the corresponding shield or outer conductor of the other line 9' but permit rotation of line 9 relative to the other.

The brushes 1, uniformly distributed over the periphery of brush holder 5, are loosely inserted into grooves 19 of the brush holder 5 that extend substantially parallel to the rotational axis of the coupling. The brushes 1 are held in position by means of an endless helical spring 7 or a similar annular elastic holding member. Since the diameter of the bottom of grooves 19 on brush holder 5 is somewhat smaller than the diameter of the outer slip ring 3, the brushes are slightly inclined relative to the rotational axis of the coupling. As a result, the brushes 1 are pressed under constant pressure against the slip ring 3, forming a line contact with the brush holder 5 and an area contact with the slip ring 3.

An inner slip ring 4 is fixed to the housing portion 17, 18 and is electrically connected with the inner contact member 29 of connector 8' and insulated from the housing 17. The connection between inner slip ring 4 and contact 29 comprises a conductor 30 soldered to the tubular inner contact 29 at 31. Insulating inserts are provided at 20, 21 and 32.

The inner slip ring 4 is contacted by brushes 2. The appertaining brush holder 6 is mechanically joined with the rotational housing portion but is electrically insulated therefrom by an insulator 21. The brush holder 6, however, is electrically connected with the inner contact member 26 of connector 8. The connection is formed by a conductor 27 soldered to the brush holder 6 at 28. The design of the inner slip-ring and brush assembly is generally similar to the outer assembly. That is, the brushes 2 are likewise inclined to the rotational symmetry axis and are held in respective peripherally distributed grooves of brush holders 6 by an elastic endless biasing member 7' such as a helical spring. The spring 7' thus holds the brushes 2 in the appertaining grooves and simultaneously presses them into area contact with the slip ring 4.

The above-described mounting of the contact brushes 1 and 2 on the appertaining brush holders 5 and 6 also affords an easy exchangeability of worn brushes. It is only necessary to loosen a set screw 24 and to unscrew housing member 14 from member 13, whereafter the coupling can be pulled axially apart, thus removing the brushes from the slip rings for inspection or replacement.

By using suitable materials for the surfaces of the contact brushes and slip rings, the contact resistance can be considerably reduced and can be kept constant. For example, when at least the surface of the brushes consists of a silver-graphite mixture and the slip rings are made of hard silver, the brushes will immediately grind themselves into proper shape, in accordance with the curvature of the slip rings. Since one of the mutually gliding parts is mixed with graphite, it is unnecessary to provide for lubrication. For that reason, the rotational coupling is suitable for use under widely varying temperature conditions.

We claim:

1. Rotational coupling for transmitting high-frequency energy from a fixed coaxial line to a rotatable coaxial line, each having respective inner and outer conductors, comprising a housing having two housing portions of which one is coaxially rotatable relative to the other, each housing portion having connector means for attachment of one of said two coaxial lines, each connector means having an outer member and a inner member for connection with the outer and inner conductors respectively, two annular and coaxial glide-contact devices mounted one within the other and each having a slip-ring member and a brush-holder member and each having peripherally distributed contact brushes mounted on said holder member and in gliding engagement with said slip ring, one of said two members of each device being mechanically joined with one of said respective housing portions and thereby electrically connected with the outer connector member thereof, the other member of said device being mechanically and electrically joined with the inner connector member of the other housing portion; and each of said two brush-holder members having peripherally distributed seats in which said respective brushes are movably seated, and an annular elastic member surrounding said holder member and engaging said brushes so as to press said brushes toward said holder member and against said slip-ring member of the same device.

2. In a rotational coupling for high-frequency coaxial lines according to claim 1, said contact brushes of each glide-contact device extending from said holder member toward said slip-ring member in a direction slightly inclined away from the rotational axis of the coupling.

3. In a rotational coupling for high-frequency coaxial lines, according to claim 1, said seats of said holder member consisting of grooves extending substantially parallel to the rotational axis, said brushes being removably engaged in said respective grooves, and said elastic member being an endless helical spring.

4. In a rotational coupling for high-frequency coaxial lines according to claim 1, said two slip-ring members being both joined with the fixed housing portion, and said two-brush-holder members being both joined with the rotatable housing portion.

5. In a rotational coupling for high-frequency coaxial lines according to claim 1, said two slip-ring members consisting of relatively hard silver, and said contact brushes having contact-surface zones consisting of a relatively soft silver-graphite mixture.

References Cited in the file of this patent

UNITED STATES PATENTS

| 2,248,759 | Hollander | July 8, 1941 |
| 2,422,961 | Hallstrand | June 24, 1947 |
| 2,449,073 | Johannesen | Sept. 14, 1948 |
| 2,476,732 | Hollingsworth | July 19, 1949 |

FOREIGN PATENTS

| 392,880 | Great Britain | May 25, 1933 |

OTHER REFERENCES

Electronic Equipment Engineering, November 1958, page 75.